UNITED STATES PATENT OFFICE.

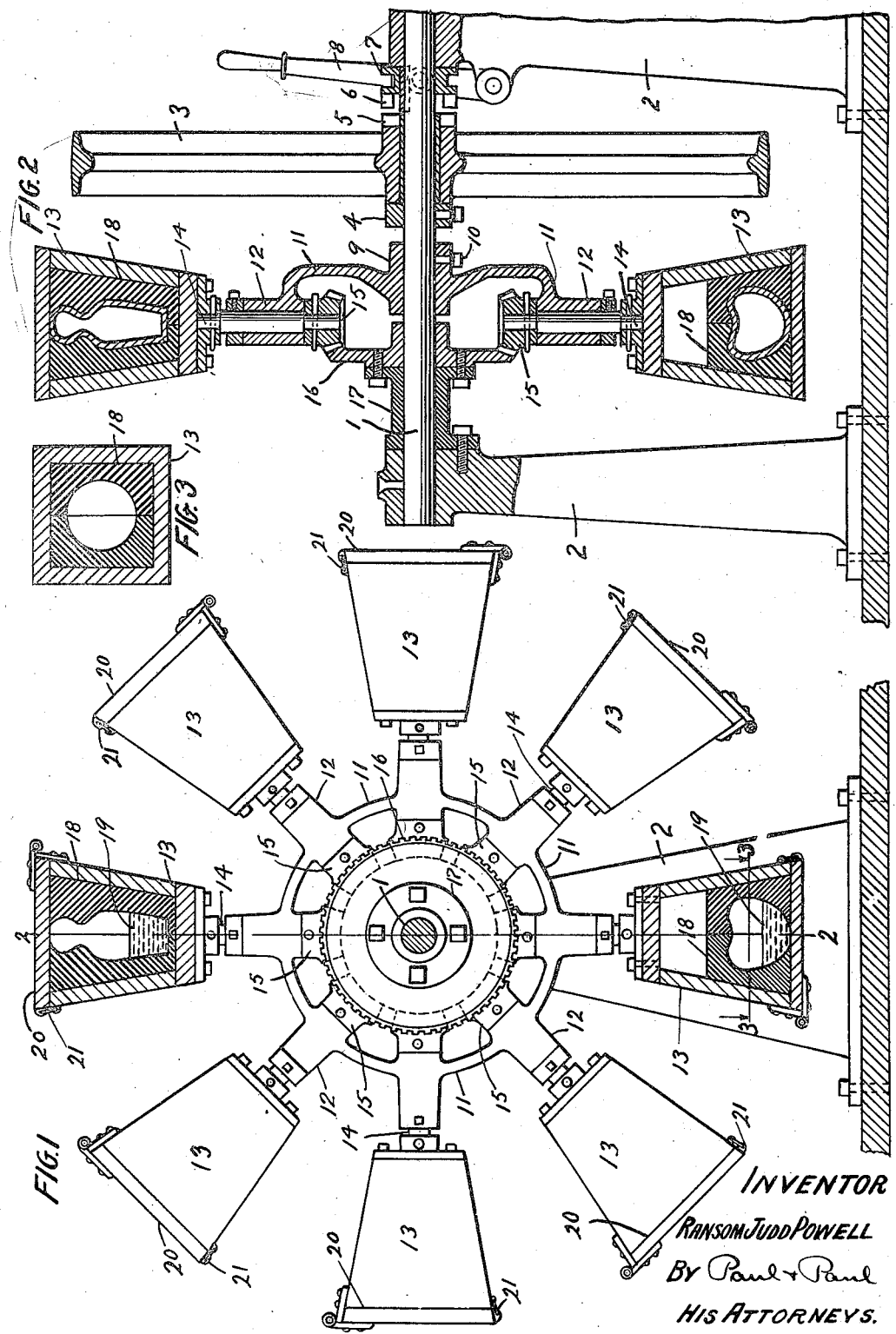

RANSOM JUDD POWELL, OF MINNEAPOLIS, MINNESOTA.

CASTING-MACHINE.

1,341,670.  Specification of Letters Patent.  Patented June 1, 1920.

Application filed October 27, 1919. Serial No. 333,605.

*To all whom it may concern:*

Be it known that I, RANSOM JUDD POWELL, a citizen of the United States, residing at Minneapolis, in the county of Hennepin and State of Minnesota, have invented certain new and useful Improvements in Casting-Machines, of which the following is a specification.

This invention relates broadly to a novel means for shaping or forming plaster, metals and other plastic materials or substances. The invention is particularly directed to the production of hollow objects by a casting or molding operation and consists broadly in achieving such result by the simultaneous turning of a matrix or mold on two different axes. For purposes of clarity and brevity in pointing out and referring to the different movements with relation to the two axes, the terms "rotation" and "revolution" are employed, the term "rotation" being employed in describing the movement of a mold about its own axis, and the term "revolution" being employed in describing the movements of the mold about another axis.

This device is adapted to be used in conjunction with molds for casting hollow objects which are substantially completely closed, and the selected embodiment of the invention here shown is directed to the casting or molding of relatively light-weight articles, such as statuary, artistic novelties, small figures, toys, etc.

The drawings illustrate molds for a hollow cast ten-pin and a fruit, such as a peach, although the articles or objects to be reproduced may obviously be of a wide range. In the casting of these objects by this machine, the material in more or less liquid state is introduced within a mold, the inner face of which is shaped to conform to the external shape of the object to be produced. The revolution of the mold on its axis of revolution, or transverse axis as it may be termed, functions to cause the plastic material to travel by gravity, from end to end of the mold, as the mold is revolved preferably slowly enough to permit such movement, and not rapidly enough to cause the material to be outwardly forced and held against the outer end of the mold, by centrifugal force. Similarly, rotation of the mold on its longitudinal axis causes the plastic material to be distributed over the lateral portions of the mold as the material travels from end to end of the mold interior. The resultant travel of the plastic material, while in the process of setting or hardening in this mold, is theoretically a spiral course. It has been found preferable to cause the mold to rotate faster than it revolves, in other words, to turn faster on its longitudinal axis than on its transverse axis. This results in the generation of some centrifugal force to overcome in some degree the gravitational force and thereby tending to hold the setting material against the longitudinal sides as it travels gravitationally back and forth responsive to revolution of the mold on its transverse axis. While the ratio of rotation to revolution may be varied within wide limits, such ratio, in the case of the objects here illustrated, is preferably four to one.

An object, therefore, of the invention is to provide a machine for casting hollow objects.

Another object is to provide a machine for casting hollow objects which are substantially completely closed.

Other objects of the invention will more fully appear from the following detailed description and the accompanying drawings and will be pointed out in the annexed claims.

In the accompanying drawings, there has been disclosed a structure designed to carry out the objects of the invention, but it is to be understood that the invention is not confined to the exact features shown as various changes may be made within its reasonable scope.

In the drawings:

Figure 1 is a view in side elevation of the machine;

Fig. 2 is a section on the line 2—2 of Fig. 1, the plastic material being shown as formed and set;

Fig. 3 is a section on the line 3—3 of Fig. 1;

In the selected embodiment of the invention, there is provided the novel combination of object-forming molds, together with means for simultaneously turning the molds on two different axes. While a single mold may be so actuated, it is desirable in the interest of uniform quantity production to so mount a plurality of molds. A simple means of achieving this result is to mount a revoluble driven element such as a shaft 1 upon suitable bearings in standards 2. This shaft 1 is revolubly driven by means of a driven pulley 3 loosely mounted on the shaft 1 and positioned by the guide collar 4. The pulley bears teeth 5 adapted to be engaged by teeth 6 on a clutch member 7 keyed to the shaft 1 and slidable axially thereon by means of the lever 8. When the clutch is moved to the left of the position shown in Fig. 2, the teeth 5 and 6 inter-engage and the shaft is revolved.

A revoluble member is mounted fast upon the shaft 1. In this preferred form such member is wheel-shaped and consists of a hub 9 secured to the shaft and revoluble therewith by means of the bolt 10. The spokes or arms 11 radially extend therefrom and terminally are provided each with a bearing portion 12. Each mold-carrying container or flask 13 is borne by a stud shaft 14 adapted to turn in the bearing portion 12. The mold-carrying flask is rotated by means of a pinion 15 fixed to the end of the stud shaft nearer to the hub 9.

In order that rotation may be imparted to each mold, a master gear 16 is fixedly secured to the standard 1 by means of the sleeve 17. The teeth of each mold pinion 15 mesh with and travel over the teeth of the fixed gear 16. Thus, as the shaft 1 revolves the molds revolve therewith and are axially rotated, while revolving, by their pinion and gear engagement. As here shown, each mold is rotated on its axis by its pinion four times during one revolution of the mold about the shaft 1. A simple means of increasing or reducing this ratio is by the substitution of pinions having a smaller or larger number of teeth. To accommodate different sized pinions, the hub 9 is longitudinally shifted on the shaft 1 within the limits shown between the hub of the gear 16 and the guide 4.

Each flask 13 is hollow to receive a mold 18 formed of any suitable substance. In the use of a plastic material, such as plaster-of-Paris, the mold may be formed of a glue composition hollowed to receive the plastic material, 19, in liquid form and having its internal face shaped to conform to the configuration of the article to be produced. The mold is externally shaped to fit the flask interior, so that relative movement between the mold and container or flask during operation is obviated. In the flask shown at the top in the drawings the mold completely fills the flask interior, while another form is shown at the bottom. In the peach mold at the bottom, the sides of the mold converge radially inwardly and the similarly shaped external portions of the mold cannot move toward the axis of revolution. Each flask is preferably provided with a cover 20, hingedly secured to the flask side and secured by a suitable fastening means 21 to hold the cover seated during operation, but easily unfastened to permit removal of the set of hardened formed objects. While any advantageous number of molds may be secured to a revoluble member, the eight-armed device has been found to work well in practice.

It should be noted that in the practising of this invention, in connection with the material and mold shapes here mentioned, that a too rapid revolution of the shaft causes the generation of a centrifugal force which functions to force the plastic material outwardly against the radial end of the mold and to effect its retention thereat and thereby to prevent its even distribution.

It is desirable that gravity be permitted to cause the material to travel in the plane of the radius of the shaft from end to end of the mold. Preferably the molds are relatively more rapidly rotated in order that the material may have some tendency to be held by centrifugal force against the axial faces of the mold. It will be obvious to one skilled in this art that some plastic materials require more centrifugal force than others and that, too, the variance in the form of the objects necessitates a variation in the force resultant from this novel combination of centrifugal forces and gravitational force. The proportion of the centrifugal force of revolution is directly variable with the pulley speed while the proportion of the centrifugal force of rotation is variable by the substitution of different pinions as above noted, which results in the change of speed of mold-rotation with relation to the speed of revolution.

Having thus described my invention, what I claim as new and desire to secure by Letters Patent, is:

1. In a machine for the casting of hollow objects, the combination of a revoluble member, a plurality of arms radially extending therefrom, a mold carrying means rotatably mounted on each radially extending arm in axial alinement therewith, and means to engage each mold carrying means to cause all molds to be rotated upon the revolution of said member.

2. In a machine for the casting of hollow objects, the combination of a standard, an element revolubly borne by said standard, a plurality of members extending therefrom and movable therewith, a mold carrying means rotatably mounted on each member, and means carried by the standard and adapted to engage each mold carrying means to cause all said molds to be rotated upon the revolution of said element.

3. In a machine for the casting of hollow objects, the combination of a standard, an element revolubly borne by said standard, a plurality of mold carrying means rotatably mounted on said revoluble element, a gear fixedly secured to said standard, a pinion secured to each mold carrying means, said pinions engaging said gear whereby when the molds are revolved about the axis of said element, each mold is simultaneously rotated.

4. In a machine for the casting of hollow objects, the combination of a revoluble member, an object-forming mold rotatably carried by said member, means to cause the simultaneous rotation of the mold and revolutions of the member, and means whereby the ratio of rotation to revolution may be varied.

5. In a machine for the casting of hollow objects, the combination of a revoluble member, a plurality of arms extending therefrom, a mold-carrying means rotatably mounted on each extending arm and means to engage each mold-carrying means to cause all molds to be rotated upon the revolution of said member.

In witness whereof I have hereunto set my hand this 21st day of October 1919.

RANSOM JUDD POWELL.